US010011062B1

(12) United States Patent
Doerner et al.

(10) Patent No.: US 10,011,062 B1
(45) Date of Patent: Jul. 3, 2018

(54) SYSTEM, METHOD, AND APPARATUS FOR MOLDING PRECISION PARTS (71) Applicant: Cavaform International, LLC, St. Petersburg, FL (US)

(72) Inventors: Charles E. Doerner, Clearwater, FL (US); David S. Massie, Treasure Island, FL (US)

(73) Assignee: Cavaform International, LLC, St. Petersburg, FL (US)

( * ) Notice: Subject to any disclaimer, the term of this patent is extended or adjusted under 35 U.S.C. 154(b) by 172 days.

(21) Appl. No.: 14/948,413

(22) Filed: Nov. 23, 2015

Related U.S. Application Data (60) Provisional application No. 62/089,606, filed on Dec. 9, 2014.

(51) Int. Cl.
*B29C 45/22* (2006.01)
*B29C 45/74* (2006.01)
*B29C 45/00* (2006.01)
*B29C 45/26* (2006.01)
*B29C 45/53* (2006.01)
*B29L 23/00* (2006.01)

(52) U.S. Cl.
CPC .......... *B29C 45/74* (2013.01); *B29C 45/0025* (2013.01); *B29C 45/22* (2013.01); *B29C 45/2608* (2013.01); *B29C 45/53* (2013.01); *B29C 2045/2683* (2013.01); *B29L 2023/22* (2013.01)

(58) Field of Classification Search
CPC ..... B29C 45/74; B29C 45/0025; B29C 45/22; B29C 45/2608; B29C 45/53; B29C 2045/2683
See application file for complete search history.

(56) References Cited

U.S. PATENT DOCUMENTS 7,214,053 B2 * 5/2007 Schottli ................ B29C 45/261
264/328.12
8,932,046 B2 * 1/2015 Tabassi ................ B29C 45/076
425/567
9,227,351 B2 * 1/2016 Tabassi ............... B29C 45/2735
(Continued)

OTHER PUBLICATIONS

Injection Molding Guide, GLS, Realize the Potential Feel the Difference, PolyOne, Apr. 21, 2003, pp. 1-31.*

*Primary Examiner* — Jill L Heitbrink
(74) *Attorney, Agent, or Firm* — Larson & Larson, P.A.; Frank Liebenow; Patrick A. Reid (57) ABSTRACT

A melt distributor has an orifice for receiving molten plastic. A plurality of melt distributor channels are in fluid communication with the orifice and each of the plurality of melt distributor channels have substantially the same length and cross-sectional volume. A plurality of injection tips terminates each of the melt distributor channels. A channel passes through each of the injection tips, a first end which is in fluid communication with a corresponding one of the melt distributor channels and a second end of which is for connecting to a corresponding injection port of a corresponding mold. Molten plastic flows at substantially equal flow rates and timing through each of the melt distributor channels and through each of the injection tips, entering each of the two injection ports of each mold at substantially the same timing, flow rate, and temperature.

19 Claims, 8 Drawing Sheets (56) References Cited

U.S. PATENT DOCUMENTS

2010/0092602 A1* 4/2010 Gunther .............. B29C 45/2735
   425/549
2011/0311676 A1* 12/2011 Fairy .................. B29C 45/2725
   425/548

* cited by examiner

SYSTEM, METHOD, AND APPARATUS FOR MOLDING PRECISION PARTS

CROSS-REFERENCE TO RELATED APPLICATION

This application claims the benefit of U.S. provisional application No. 62/089,606 filed on Dec. 9, 2014, the disclosure of which is incorporated by reference.

FIELD

This invention relates to the field of plastic injection molding and more particularly to a system, method, and apparatus for molding precision parts to high tolerances.

BACKGROUND

There is a need for part production of straighter parts in the field of plastic injection molding. Existing plastic injection practices reliably produce plastic parts of certain measured straightness, but falls short when very straight parts are needed, especially when molding longer parts such as pipettes. Pipettes are typically used to measure and deposit precise amounts of a liquid into a target container. Often an array of pipettes is arranged in parallel for parallel depositing into multiple targets such as cylindrical containers. Using warped or bent pipettes increases the potential of one target receiving the liquid from two pipettes while an adjacent target receiving none of the liquid. Therefore, the users of pipettes have been requesting straighter and straighter parts that were previously difficult to produce.

In plastic injection molding, molten plastic is injected into a mold and the molten plastic flows until filling up the entire mold, then the plastic solidifies and the finished part is ejected from the mold. For long parts, such as pipettes, in prior methods, the plastic enters one location of the mold and cools at different rates on each side of the part, thereby causing a slight bending of the parts that leads to straightness issues with respect to the linearity (or straightness) of the resulting parts. Typically, the parts bow inwards towards the hot side of the tool resulting in uneven shrinkage between opposing sides. To reduce this difference, dual gate systems have been introduced to allow entry of the molten plastic from, for example, two sides of the mold, but issues exist with this technology due to the delivery of the molten plastic not being balanced and symmetrical. For example, if the injection channels are of differing length, thickness, and/or initial temperatures.

Another issue in injection molding is waste, typically created in the injection process by runners—the plastic in excess of what is needed to produce the plastic part, typically ejected from the mold along with the part. Such runners are typically ground and sold for use in other applications that require lower tolerances and applications that are capable of utilizing non-virgin material; typically at a greatly reduced price over the virgin plastic. Therefore, it is financially important to reduce or eliminate waste caused by runners.

What is needed is a system that will mold precision plastic parts.

SUMMARY

In one embodiment, a melt distributor is disclosed including an orifice for receiving molten plastic. A plurality of melt distributor channels in a melt distributor base are in fluid communication with the orifice and each of the plurality of melt distributor channels are substantially similar, having substantially the same length and cross-sectional volume. A plurality of injection tips terminates each of the melt distributor channels. A channel passes through each of the injection tips, a first end which is in fluid communication with a corresponding one of the melt distributor channels and a second end of which is for connecting to a corresponding injection port of a corresponding mold assembly. Molten plastic flows at substantially equal flow rates and timing through each of the melt distributor channels and through each of the injection tips, entering each of the two injection ports of each mold assembly at substantially the same timing, flow rate, and temperature.

In another embodiment, a system for molding plastic parts is disclosed including an injection nozzle interface plate for attaching to a press. The injection nozzle interface plate receives molten plastic from the press through a machine nozzle interface. A melt distributor has a melt distributor base with an orifice for receiving molten plastic from the machine nozzle interface and is connected thereto. The melt distributor base has a plurality of melt distributor channels in fluid communication with the orifice, each of which is substantially the same length and volume. There are plurality of mold assemblies, each have two injection ports. A plurality of injection tips connect pairs of the melt distributor channels with input ports of the mold assemblies. A channel passes through each of the injection tips, a first end of each of the channels being in fluid communication with a corresponding one of the melt distributor channels and a second end of each of the channels is in fluid communication with a corresponding injection port of a corresponding mold assembly. Molten plastic under pressure flows at substantially equal flow rates and timing through each of the melt distributor channels and through each of the injection tips, entering each of the two injection ports of each mold at substantially the same timing, flow rate, and temperature.

In another embodiment, a melt distributor is disclosed including a melt distributor body made of steel and having an orifice in the melt distributor body for receiving molten plastic. It is preferred that the orifice be substantially centrally located in the melt distributor body. A plurality of melt distributor channels radially extending from the orifice. The melt distributor channels are in fluid communication with the orifice and each of the plurality of melt distributor channels are substantially the same length and volume. Each of the melt distributor channels have an open end for connecting to a corresponding injection port of a corresponding mold assembly. In use, molten plastic under pressure flows at substantially equal flow rates and timing through each of the melt distributor channels, exiting the open end and into the mold assemblies.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Referring to FIGS. 1-4, views of an injection tip 10 are shown. The injection tip 10 provides an interface between the melt distributor base 32 (see FIGS. 10-13) and the mold cavity 74 (see FIGS. 9 and 13). Molten plastic flows from the melt distributor base 32, through the injection tips 10, out the injection tip orifice 12, and into part area 72 between the mold cavity 74 and the mold core 70. As an example of a part area 72, a portion of a mold assembly 75 for a pipette is shown, though any known or future mold assembly 75 is anticipated. In this example, the molded part 71 (e.g., pipette) is formed between the mold cavity 74 and a mold core 70, as will be described.

Two opposing injection tips 10 are configured for each mold assembly 75. In the example shown, the melt distributor 30 is configured for eight mold assemblies 75, therefore using sixteen injection tips 10, but there is no limitation on the number of mold assemblies 75 and, therefore, the number of injection tips 10.

Each injection tip 10 has a body 16, a threaded interface 14 and a channel 18 extending through the body 16 and through the threaded interface 14, exiting at the injection tip orifice 12. The threads of the threaded interface 14 mate with threads of the threaded seal 20 (see FIGS. 5-8). An exemplary configuration showing the melt distributor 30, the threaded seal 10, and the threaded seal 20 is shown with FIG. 9.

Referring to FIGS. 5-8, views of a threaded seal 20 are shown. The threaded seal 20 has a body portion 22 with an outer diametric seal 28 and inner threads 26. The outer diametric seal 28 mates with the internal seal 39 of the mold cavity 74. The inner threads 26 mate with the threads 14 of the injection tip 10. The injection tip 10 is rotated, for example using a tool (e.g., torque wrench, not shown) to adjust the tension between the injection tip 14 and the melt distributor base 32.

Figure 1:
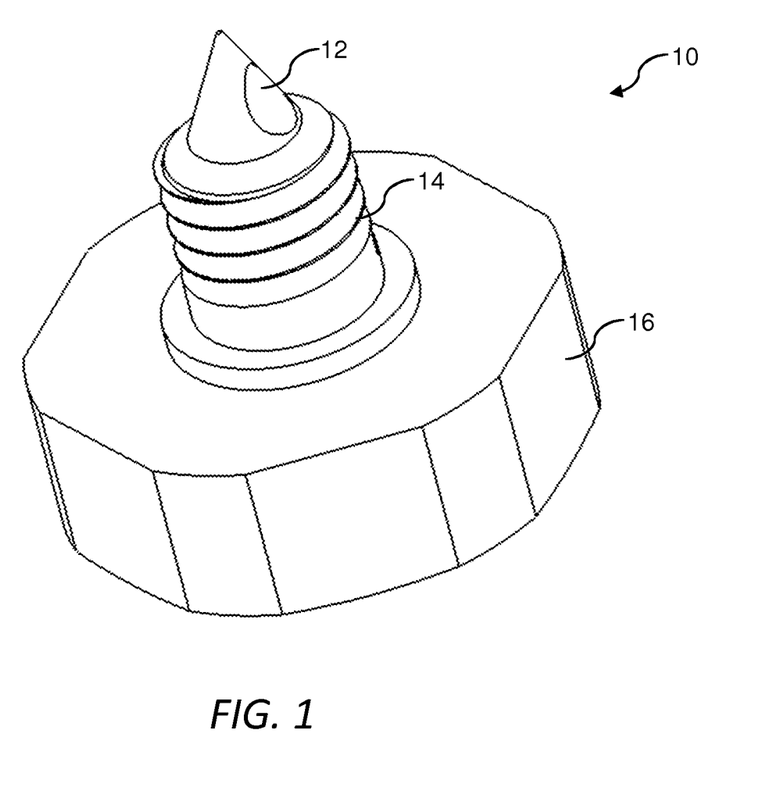
FIG. 1 illustrates a perspective view of an injection tip.
Figure 2:
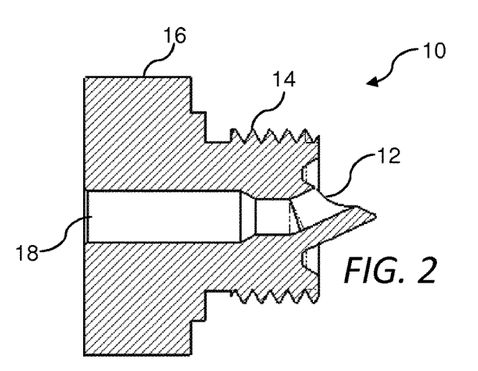
FIG. 2 illustrates a cut-away view of the injection tip.
Figure 3:
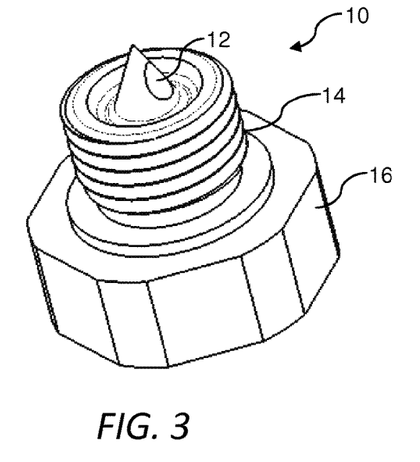
FIG. 3 illustrates a second perspective view of the injection tip.
Figure 4:
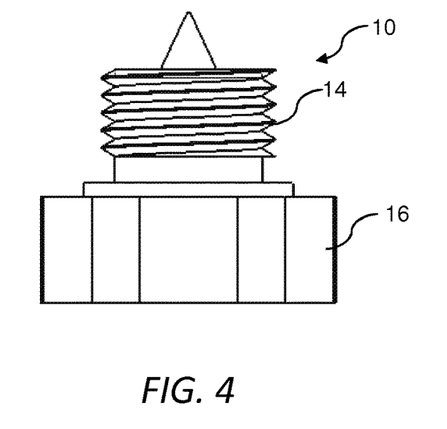
FIG. 4 illustrates an elevation view of the injection tip.
Figure 5:
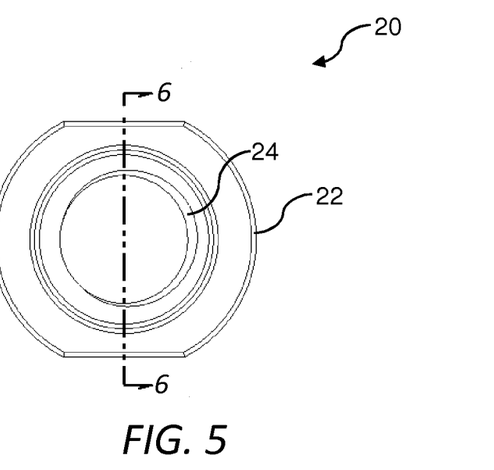
FIG. 5 illustrates a plan view of threaded seal.
Figure 6:
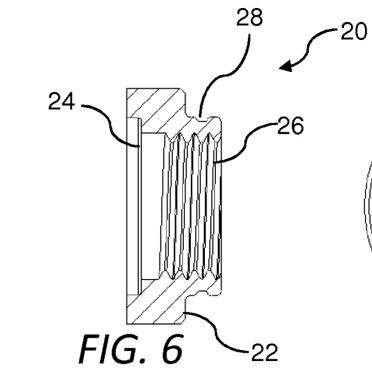
FIG. 6 illustrates a cut-away view of the threaded seal.
Figure 7:
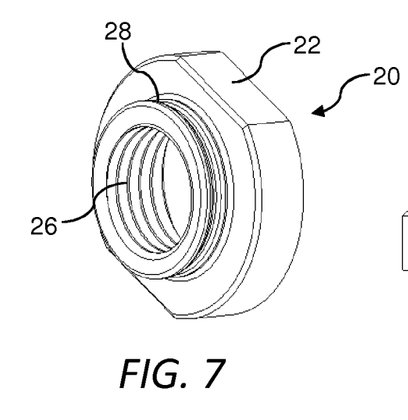
FIG. 7 illustrates a perspective view of the threaded seal.
Figure 8:
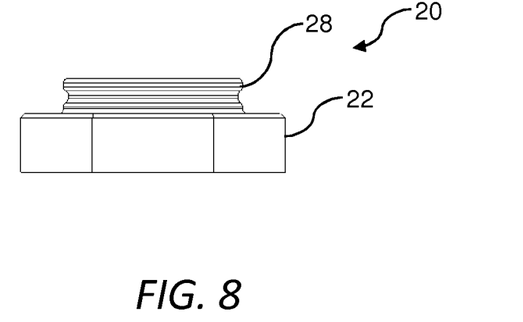
FIG. 8 illustrates an elevation view of the threaded seal.
Figure 9:
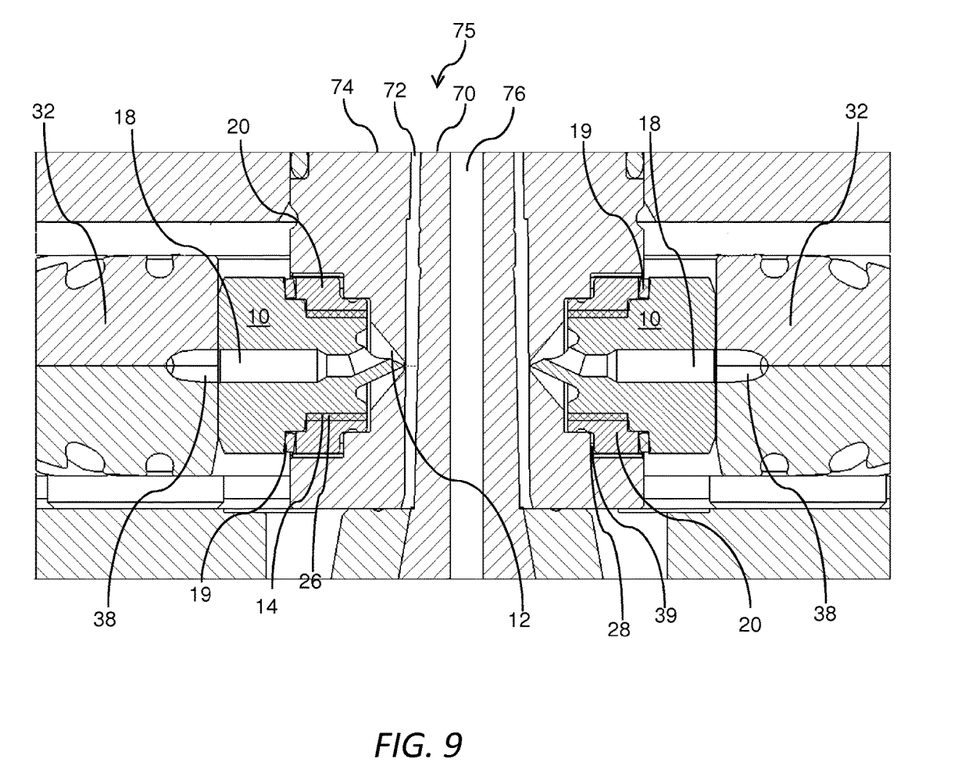
FIG. 9 illustrates a cut-away view of the injection tip, threaded seal, and melt distributor base.

Referring to FIG. 9, a cut-away view of the injection tip 10, threaded seal 20, and melt distributor 30 is shown. In the view of FIG. 9, the seals 28/39 are set (torque is applied) and ready for plastic injection. Plastic flows from the melt distributor channels 38 and exit ports 34, through the channels 18 of the injection tip 10, from the injection tip orifice 12, and into a part area 72 between the mold cavity 74 and the mold core 70. The plastic then hardens and forms a part in the area 72 between the mold cavity 74 and the mold core 70.

The outer diametric seal 28 is shown seated in the mold cavity 74.

For removal of the mold cavity 74, the threads 14 of the injection tip 10 are threaded into the threads 26 of the threaded seal 20, compressing the spring washer 19 and, thereby breaking the seal between the melt distributor body 32 and the body 16 of the injection tip 10.

For insertion and sealing to the mold cavity 74, the threads 14 of the injection tip 10 are threaded out of the threads 26 of the threaded seal 20, thereby making a seal between the melt distributor body 32 and the body 16 of the injection tip 10.

As known in the art, it is anticipated that the mold cavity 74 and mold core 70 include one or more cooling channels 76, though such cooling channels 76 are optional.

Figure 10:
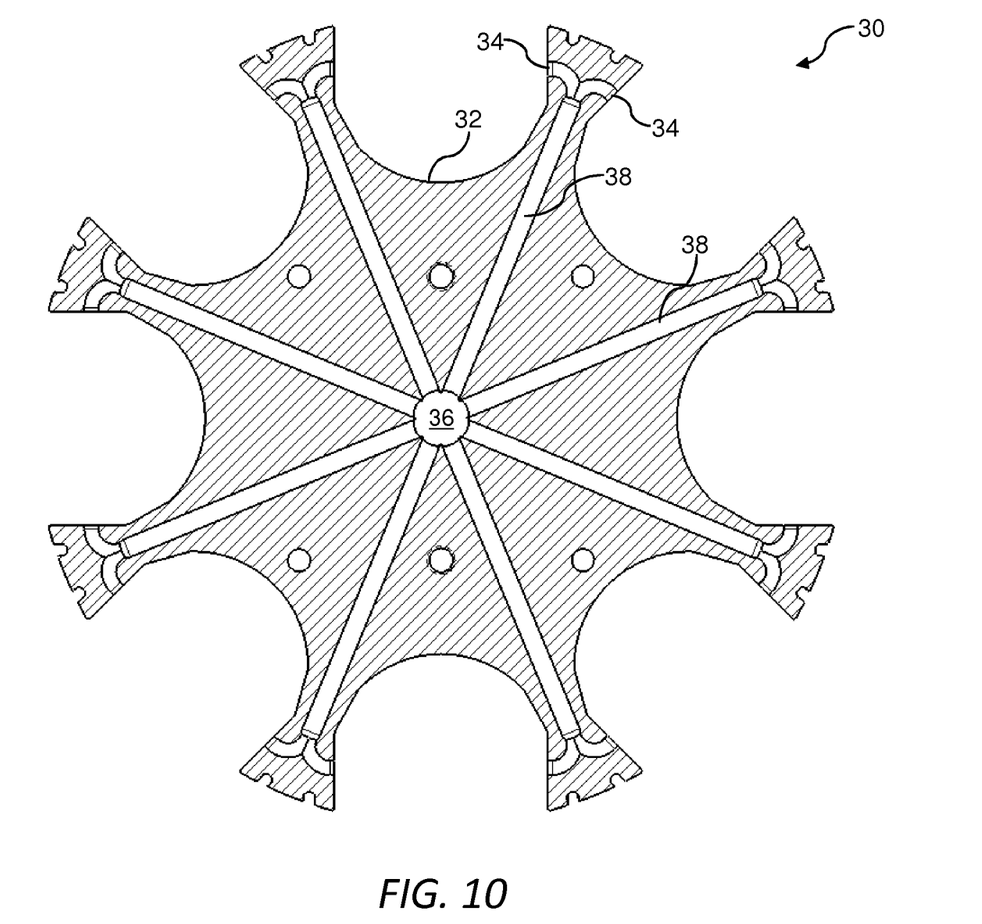
FIG. 10 illustrates a cross-sectional view of a melt distributor.
Figure 11:
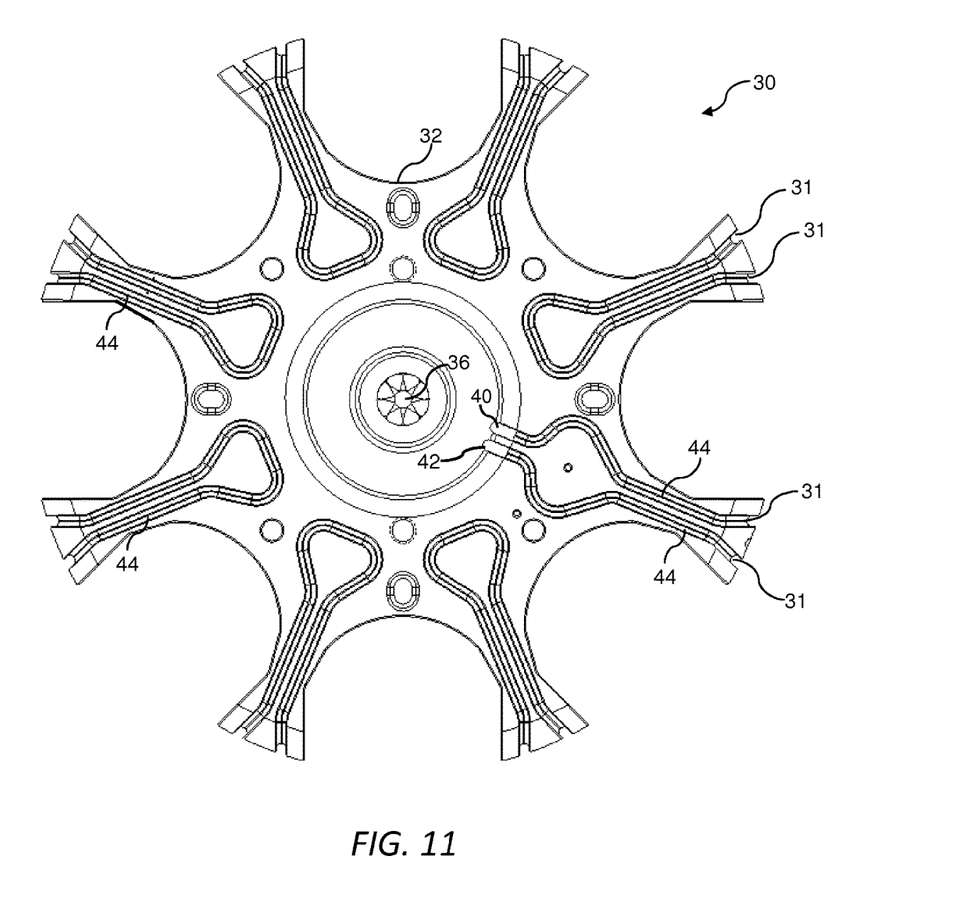
FIG. 11 illustrates a plan view of one side of the melt distributor.
Figure 12:
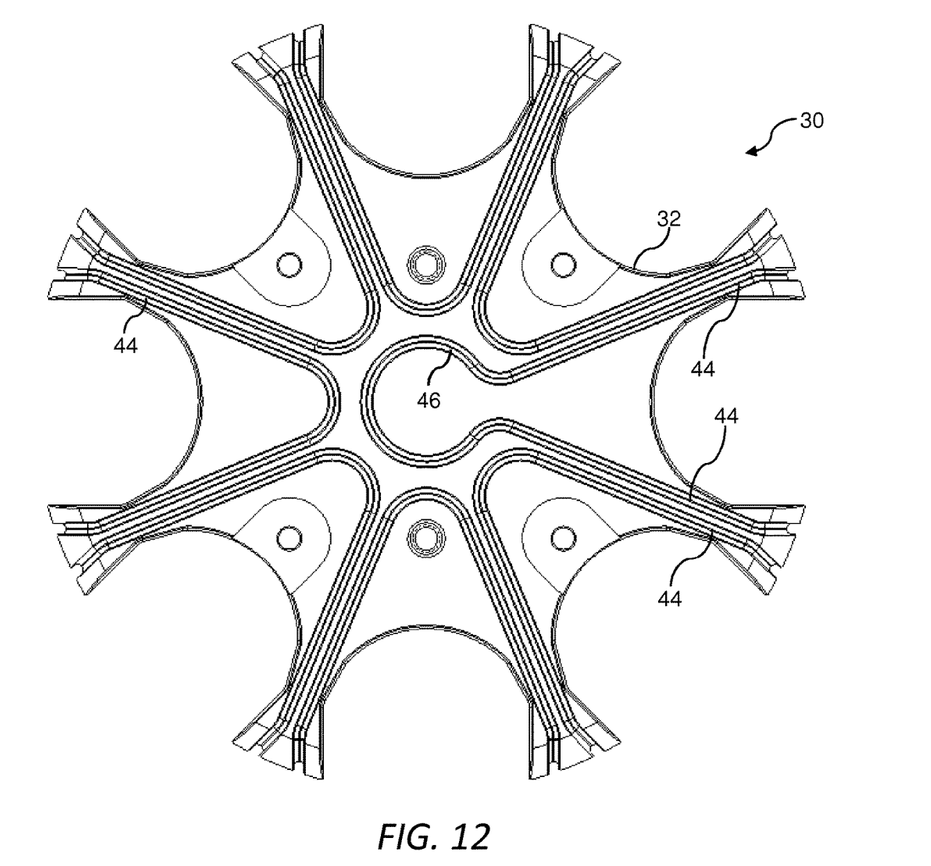
FIG. 12 illustrates a plan view of the opposing side of the melt distributor.

Referring to FIGS. 10-12, views of a melt distributor 30 are shown. As shown in FIG. 10, the melt distributor 30 includes a melt distributor base 32 that has melt distributor channels 38 with exit ports 34 extending from a substantially central orifice 36. Molten plastic enters the central orifice 36 and flows through the melt distributor channels 38 then through the exit ports 34, towards the mold assembly 75. In this example, there are eight melt distributor channels 38 and 16 exit ports 34, though any number of melt distributor channels 38 and exit ports 34 are anticipated. Each of the melt distributor channels 38 pass through the melt distributor body 32 and branch out symmetrically into two exit ports 34. The exit ports 34 interface with the injection tip 10 as shown in FIG. 9.

Although any method of fabricating the melt distributor 30 is anticipated, one known method is to fabricate symmetrical half-channels 38 and half-exit ports 34 into two half sections of steel, then aligning and bonding the two sections of steel, creating the melt distributor channels 38 and exit ports 34.

As is shown in FIG. 10, the melt distributor channels 38 and exit ports 34 are substantially symmetrical, having substantially equal lengths, cross-sectional volume, curves, and radii. In this, the timing of molten plastic reaching each adjacent injection tip 10 is substantially synchronized such that molten plastic arrives at each of the two gates into the mold cavities 74 at substantially the same time and substantially the same flow rate, thereby greatly improving the precision of the molded part by reducing warping or bending of the molded part 71 (see FIG. 13).

As is known in the industry, melt systems are often heated to keep the plastic in a molten state. In the past, individual heating elements were associated with different areas of the melt systems, creating thermal variances due to heating element to different heating element tolerance issues. Unequal heating results in unequal flow rates; and unequal flow rates result in warping or bending of the resulting parts. Such warping or bending lowers of the precision of the resulting parts due to uneven temperatures.

As shown in FIGS. 11 and 12, the melt distributor 30 has one single heating element 44/46 that is wound around the entire melt distributor base 32 to evenly heat each of the melt distributor channels 38 and exit ports 34. Power is connected to two contacts 40/42 and, by nature of one single heating element 44/46 wound from one contact 40 to the other contact 42, the flow of current is equalized across the entire heating element 44/46 (e.g., the current measured at any point of the heating element 44/46 is equal to the current measured at any other point of the heating element 44/46). Therefore, each length of the heating element 44/46 heats substantially the same amount as each other segment, providing even heating of all of the melt distributor channels 38 and exit ports 34.

In the exemplary melt distributor 30, the heating elements 44/46 substantially follow the melt distributor channels 38 over a first side of the melt distributor base 32 (as shown in FIG. 11), looping around the edges 31 of the melt distributor base 32 in vicinity of the exit ports 34, then again substantially following the melt distributor channels 38 on the opposite side of the melt distributor base 32 (as shown in FIG. 12). A loop 46 (see FIG. 12) provides heat around the central orifice 36 (see FIG. 11).

Note that the exact routing and order of the heating element 44/46 is shown as an example, and any routing and connection scheme is anticipated. Further, there is no limitation as to the placement, location, or existence of the contacts 40/42.

Figure 13:
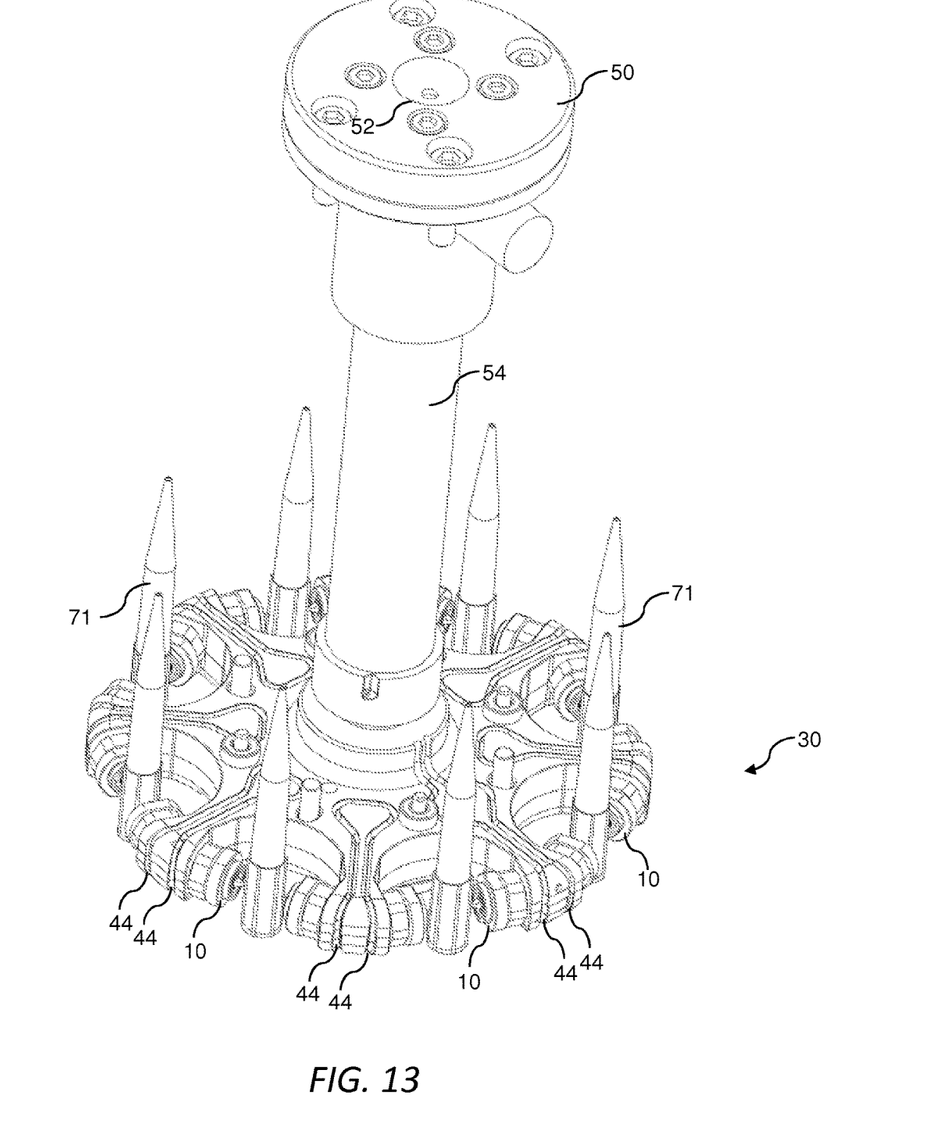
FIG. 13 illustrates a perspective view of the assembled system.

Referring to FIG. 13 illustrates a perspective view of the assembled system. The outer portion of the mold cavities 74 have been removed to show the molded part 71 with respect to the injection tips 10.

In this view, the melt distributor 30 is shown with the heating element 44 on the melt distributor base 32. Multiple injection tips 10 are interfaced between the melt distributor base 32 and their respective molds cavities 74 and mold cores 70 (note that in FIG. 13, the molds cavities 74 are removed, exposing the molded parts 71 for clarity reasons). The injection machine nozzle interface plate 50 is in fluid communication with a press (not shown) and the plastic flows into the machine nozzle interface plate 50 through the machine nozzle interface radius 52, flowing through the extension 54, and to the melt distributor 30. Note that, although not required, it is preferred that the machine nozzle interface plate 50 and extension 54 be heated. Note that although the arrangement of the melt distributor 30 is shown for simultaneous molding of eight parts; melt distributors 30 of any configuration are anticipated, including, but not limited to, melt distributors 30 that are configured to produce four, eight, sixteen, thirty-two, forty-eight, and sixty-four parts, etc. In some systems, additional manifold systems distribute the plastic to multiple nozzles 50/52/54 feeding multiple melt distributors 30.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A melt distributor for a two-port mold comprising:
   an orifice for receiving molten plastic;
   a plurality of melt distributor channels are in a monolithic melt distributor base of the melt distributor, the melt distributor channels in fluid communication with the orifice, each of the plurality of melt distributor channels are substantially the same length and cross-sectional volume;
   a heating element for heating the monolithic melt distributor base; and
   a plurality of injection tips, a channel passing through each of the injection tips, a first end of each of the channels is in fluid communication with a corresponding one of the melt distributor channels and a second end of each of the channels is for connecting to a corresponding injection port of a corresponding mold assembly;
   whereas molten plastic under pressure flows at substantially equal flow rates and timing through each of the melt distributor channels and through each of the injection tips, for entering each of the corresponding injection ports of each mold assembly at substantially the same timing, flow rate, and temperature;
   whereas each mold assembly receives the molten plastic from two of the injection tips, the two injection tips receive the molten plastic from two adjacent melt distributor channels.

2. The melt distributor of claim 1, wherein the heating element is a single, continuous induction heating element that traverses all melt distributor channels.

3. The melt distributor of claim 2, wherein the single, continuous induction heating element is one continuous induction heating element on the monolithic melt distributor base, thereby producing substantially congruent temperatures through each of the melt distributor channels.

4. The melt distributor of claim 3, wherein the single, continuous induction heating element is placed in troughs on an outside surface of the monolithic melt distributor base, the troughs formed at least partially in parallel with each of the melt distributor channels.

5. The melt distributor of claim 1, wherein the injection tip is threaded into a threaded seal, the threaded seal diametrically sealed to the mold assembly such that, turning of the injection tip into the threaded seal releases the injection tip from the monolithic melt distributor base for removal of the mold assembly from the melt distributor.

6. A system for molding plastic parts, the system comprising:
   an injection nozzle interface plate for receiving molten plastic from a press, the injection nozzle interface plate having a machine nozzle interface radius for receiving molten plastic from a press;
   a melt distributor, the melt distributor having a monolithic melt distributor base that is heated, the monolithic melt distributor base having an orifice for receiving molten plastic from the machine nozzle interface radius, the monolithic melt distributor base having a plurality of melt distributor channels in fluid communication with the orifice, each of the plurality of melt distributor channels being symmetrical and of substantially the same length and volume;
   a plurality of mold assemblies, each mold assembly having two injection ports; and
   a plurality of injection tips, a channel passing through each of the injection tips, a first end of each of the channels being in fluid communication with a corresponding one of the melt distributor channels and a second end of each of the channels is in fluid communication with a corresponding injection port of a corresponding one of the mold assemblies;
   whereas molten plastic under pressure flows at substantially equal flow rates and timing through each of the melt distributor channels and through each of the injection tips, thereby entering each of the two injection ports of each mold assembly at substantially the same timing, flow rate, and temperature;
   whereas each mold assembly receives the molten plastic into each of two of the injection tips, each of the two injection tips receive the molten plastic from two adjacent melt distributor channels.

7. The system for molding plastic parts of claim 6, wherein the monolithic melt distributor base is heated by a single, continuous induction heating element that traverses all melt distributor channels.

8. The system for molding plastic parts of claim 7, wherein the single, continuous induction heating element is one continuous induction heating element passing over and in contact with the monolithic melt distributor base, thereby producing substantially congruent temperatures through each of the melt distributor channels.

9. The system for molding plastic parts of claim 8, wherein the single, continuous induction heating element is placed in troughs on an outside surface of the monolithic melt distributor base, the troughs formed at least partially in parallel with each of the melt distributor channels.

10. The system for molding plastic parts of claim 6, wherein the injection tip is threaded into a threaded seal, the threaded seal diametrically sealed to the mold assembly such that, turning of the injection tip into the threaded seal releases a seal between the monolithic melt distributor and the injection tip for removal of the mold assembly from the melt distributor base.

11. The system for molding plastic parts of claim 6, wherein each of the mold assemblies includes a mold cavity and a mold core, whereas the molten plastic flows between the mold cavity and the mold core, forming a molded part after cooling.

12. The system for molding plastic parts of claim 11, wherein the molded part is a pipette.

13. A melt distributor comprising:
a monolithic melt distributor body made of steel;
an orifice in the monolithic melt distributor body for receiving molten plastic; and
a plurality of melt distributor channels within the monolithic melt distributor body, radially extending from the orifice, the melt distributor channels being in fluid communication with the orifice, each of the plurality of melt distributor channels are substantially symmetrical, having the same length and volume;
whereas each of the melt distributor channels have an open end for connecting to a corresponding injection port of a corresponding mold assembly;
whereas molten plastic under pressure flows at substantially equal flow rates and timing through each of the melt distributor channels, exiting the open end;
whereas each mold assembly receives the molten plastic from two of the injection tips, the two injection tips receive the molten plastic from two adjacent melt distributor channels.

14. The melt distributor of claim 13, wherein the melt distributor is heated by a single, continuous induction heating element that traverses all melt distributor channels.

15. The melt distributor of claim 14, wherein the single, continuous induction heating element is a single, continuous induction heating element positioned over the monolithic melt distributor body thereby producing substantially congruent temperatures between each of the melt distributor channels.

16. The melt distributor of claim 15, wherein the single, continuous induction heating element is positioned in troughs on an outside surface of the monolithic melt distributor body, the troughs formed at least partially in parallel with each of the melt distributor channels.

17. The melt distributor of claim 13, wherein an injection tip is threaded into a threaded seal in the mold assembly, the threaded seal is diametrically sealed to the mold assembly and turning of the injection tip into the threaded seal releases a seal between the monolithic melt distributor body and the injection tip for removal of the mold assembly from the melt distributor body.

18. The melt distributor of claim 17, wherein the mold assembly includes a mold cavity and a mold core.

19. The melt distributor of claim 18, wherein the molten plastic fills the mold assembly between the mold cavity and the mold core, forming a pipette after the molten plastic cools.

* * * * *